US012584826B1

(12) United States Patent (10) Patent No.: US 12,584,826 B1

Etheridge et al. (45) Date of Patent: Mar. 24, 2026

(54) DIRECT EXTRACTIVE SYSTEMS AND METHODS FOR MONITORING EMISSIONS

(71) Applicant: ENCINO ENVIRONMENTAL SERVICES, LLC, Alleyton, TX (US)

(72) Inventors: Joe Etheridge, Alleyton, TX (US); James Timmins, Alleyton, TX (US)

(73) Assignee: ENCINO ENVIRONMENTAL SERVICES, LLC, Alleyton, TX (US)

( * ) Notice: Subject to any disclaimer, the term of this patent is extended or adjusted under 35 U.S.C. 154(b) by 0 days.

(21) Appl. No.: 19/040,952

(22) Filed: Jan. 30, 2025

Related U.S. Application Data

(60) Provisional application No. 63/698,908, filed on Sep. 25, 2024.

(51) Int. Cl.
G01N 1/24 (2006.01)

(52) U.S. Cl.
CPC ...................................... G01N 1/24 (2013.01)

(58) Field of Classification Search
CPC ..... G01N 1/24; G01N 1/26; G01N 2001/2291
USPC ............................................... 73/23.2, 23.31
See application file for complete search history.

(56) References Cited

U.S. PATENT DOCUMENTS

| | | |
|---|---|---|
| 4,069,018 A | 1/1978 | Karna et al. |
| 4,191,541 A | 3/1980 | Jenkins |
| 2021/0254760 A1 | 8/2021 | Clark et al. |
| 2022/0326203 A1 | 10/2022 | Armitage |

| | | | |
|---|---|---|---|
| 2023/0135269 A1* | 5/2023 | Elkins | ................ G01N 33/0004 |
| | | | 73/53.01 |
| 2023/0314261 A1 | 10/2023 | Schulte | |
| 2023/0314391 A1 | 10/2023 | Millar et al. | |

FOREIGN PATENT DOCUMENTS

| | | | |
|---|---|---|---|
| CN | 101672837 A | * | 3/2010 |
| CN | 108196003 A | | 6/2018 |
| CN | 109765339 A | | 5/2019 |
| CN | 213148501 U | * | 5/2021 |

(Continued)

OTHER PUBLICATIONS

DataSheet kunak Air, The most advanced and reliable solution for air quality monitoring, [From the Internet] www.kunakair.com, pp. 1-12.

(Continued)

*Primary Examiner* — Laura Martin
*Assistant Examiner* — Nashmiya S Fayyaz
(74) *Attorney, Agent, or Firm* — HUNTON ANDREWS KURTH LLP

(57) ABSTRACT

The application pertains to a portable emission monitoring system comprising a gas detector comprising a first and second sample port. A first tubing connects the first sample port to a first area to be monitored for a first gas and a second tubing connects the second sample port to a second area to be monitored for a second gas. One or more pumps are connected to the first tubing and the second tubing. The one or more pumps draw gas from the first area and the second area to the first sample port and the second sample port. The detector measures the concentration of drawn gas from the first area in the first sample port and also measures the concentration of drawn gas from the second area in the second sample port. A portable skid may be employed to mount the gas detector and the one or more pumps.

24 Claims, 4 Drawing Sheets

(56)          References Cited

FOREIGN PATENT DOCUMENTS

| | | | | |
|---|---|---|---|---|
| CN | 114354769 A | * | 4/2022 | |
| CN | 117967461 A | * | 5/2024 | .......... F01D 21/003 |
| JP | H0511858 A | * | 1/1993 | |
| WO | 2023/049514 A1 | | 3/2023 | |

OTHER PUBLICATIONS

Notification of Transmittal of the International Search Report and the Written Opinion of the International Searching Authority issued in PCT/US2025/047740, mailed Dec. 1, 2025, 10 pages.

* cited by examiner

340

310

330

350

300

320

220

DIRECT EXTRACTIVE SYSTEMS AND METHODS FOR MONITORING EMISSIONS

CROSS-REFERENCE TO RELATED APPLICATIONS

The present application claims priority from U.S. Provisional Application No. 63/698,908 filed on Sep. 25, 2024 which application is incorporated herein by reference. The application is also related to U.S. application Ser. No. 18/777,006 filed Jul. 18, 2024 and U.S. Pat. No. 12,049,355 each of which is incorporated herein by reference.

FIELD OF THE DISCLOSURE

The present disclosure relates to portable methods and systems for remote monitoring emissions from, for example, multiple thief hatches.

BACKGROUND AND SUMMARY

Current emissions monitoring equipment is generally not suitable for hazardous areas in which flammable gases, and those that are can be limited in their features, performance, and configurability by the requirements of Class 1, Division I certification, which certifies the equipment for continuous use in areas which may contain flammable or ignitable gases, vapors, or liquids under normal operating conditions. Achieving this certification is costly and/or time-consuming and may limit the incorporation of new features. Additionally, intrinsically safe enclosures may prohibit certain features from being added altogether. Alternative emissions monitoring systems are needed which do not always require costly or time-consuming certification. It would further be desirable if such systems were somewhat modular and flexible so new features or equipment could be readily added or modified to, for example, monitor additional or alternative substances. Advantageously, the systems described here accomplish one or ore up to all the aforementioned needs.

The present application solves a number of problems and generally relates to a system that typically uses non-classified equipment placed outside of a hazardous area to monitor gas emissions inside the hazardous area. It is modular and configurable and generally limited only by whatever site-specific restrictions may be imposed by the user.

In one embodiment the application pertains to a portable emission monitoring system comprising a gas detector comprising a first and second sample port. A first tubing connects the first sample port to a first area to be monitored for a first gas and a second tubing connects the second sample port to a second area to be monitored for a second gas. One or more pumps are connected to the first tubing and the second tubing. The one or more pumps draw gas from the first area and the second area to the first sample port and the second sample port. The detector measures the concentration of drawn gas from the first area in the first sample port and also measures the concentration of drawn gas from the second area in the second sample port. A portable skid may be employed to mount the gas detector and the one or more pumps.

BRIEF DESCRIPTION OF THE DRAWINGS

Various embodiments of the present disclosure, together with further objects and advantages, may best be understood by reference to the following description taken in conjunction with the accompanying drawing.

DETAILED DESCRIPTION

Figure 1A:
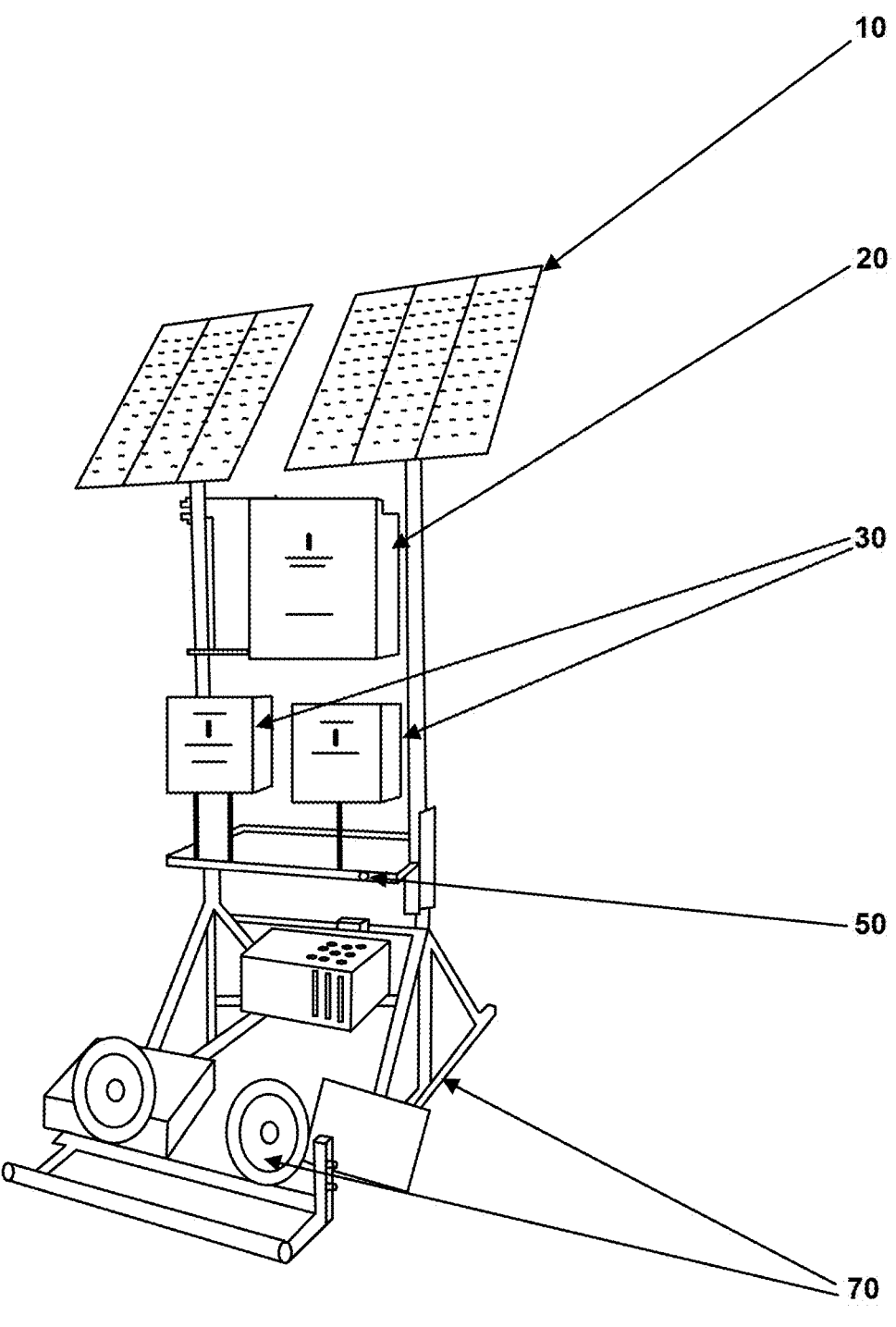
FIG. 1A shows a front view of a representative system described here.

The application pertains to portable, e.g., mobile, emission monitoring systems that are advantageously portable and/or modular. The systems described herein generally do not need to employ, for example, buried sample lines or other permanent structures, but rather, can be deployed if/when/where needed or desired. The system typically employs a gas detector comprising a first and second sample port.

The specific gas detector is not particularly critical and typically may be any detector that is capable of measuring the specific gas or gases to be monitored and has at least two or more sample ports, e.g., from about two to about six sample ports, for measuring gases from two or more areas, e.g., plants, stacks, tanks, or other sources of gas emission. Exemplary gases that may be monitored include, for example, methane, carbon dioxide, carbon monoxide, hydrogen sulfide, a nitrogen oxide, volatile organic compounds, or any mixture thereof. The first gas, second gas, or additional gases to be monitored may comprise the same or different gases while the detector(s) may detect concentrations such as, for example, pre-determined levels of concentration of drawn gases from one ore sample ports. Such pre-determined levels of concentration may vary depending upon the application and may range from about 0 to about 10,000 ppm and/or from about 10,000 ppm to about 100%.

If two or more areas are to be monitored, then generally a separate tubing line connects each sample port of a gas detector to the area from which gas is to be detected. For example, if two areas are to be monitored, then a first tubing that connects the first sample port to a first area to be monitored for a first gas and a second tubing that connects the second sample port to a second area to be monitored for a second gas. Of course, the first and the second gas may be the same or different and could be, for example, methane, carbon dioxide, carbon monoxide, hydrogen sulfide, a nitrogen oxide, volatile organic compounds, or any mixture thereof. The detector is configured to measure the concentration of drawn gas from areas, e.g., the detector measures the concentration of drawn gas from the first area in the first sample port and the detector measures the concentration of drawn gas from the second area in the second sample port Generally each sample port has a separate tubing line connecting the sample port to the emission source or area to be monitored. The dimensions and material of the tubing materials are not particularly critical so long as sufficient representative gas may be delivered to a sample from an emission source without significant degradation or contamination of the gas sample from the tubing. Suitable tubing materials may vary depending upon the gas to be delivered, desired flow rate, and other factors. Suitable tubing may comprise, for example, stainless steel or other metal a thermoplastic polymer such as, for example, a polytetrafluoroethylene. If desired, tubing may be enclosed or surrounded by material configured to protect the tubing from damage such as the elements. Thus, in some embodiments tubing may be enclosed by, for example, a braided stainless steel or other metal.

The system may comprise one or more pumps operably connected to the first, the second, and/or additional tubing in a manner such that the one or more pumps draw gas from the area to be monitored to the sample ports though the tubing. Such pumps may be, for example, continuous pumps to continuously draw gas from the area to the sample port. In this manner, continuous monitoring of gas levels may be employed. The one or more pumps may be configured to draw ambient air from the area to be monitored and into the sample chamber.

As described above, the area to be monitored may include, for example, plants, stacks, tanks, or other sources of gas emission. Thus, ambient air near the emission source may be monitored by drawing ambient air through the one or more pumps and associated tubing and/or connecting the one or more pumps to one or more sources of gas emissions by drawing directly from the source. In some embodiments the one or more areas to be monitored may comprise one or more tanks. In those cases it may be desirable to employ an adapter and a vapor ring. That is, the end of the tubing(s) to be connected to the tank(s) may comprise an adapter configured to be attached to a vapor ring on a hatch of the tank(s). Additionally or alternatively, one, two, or more positions on a tank or more than one tank may be monitored using the system.

If desired, a portable skid may be employed for mounting gas detectors, the one or more pumps described above, and or any other components described herein. In this manner the system is advantageously portable to any remote location where monitoring of one or more areas is desired. The specific configuration of the skid may vary depending upon the location, detectors, pumps, and/or other associated equipment.

In some embodiments, the skid may comprise one or more wheels and two or more handles or alternatively a mechanism to be towed in a manner of a conventional trailer. In some embodiments the skid may be configured receive tubing at a height above the ground such that strain relief is provided. For example, the skid may comprise a boom receiver and then may comprise a sample line routed through, for example, a "sample receiver" to the inlet of each emissions module (pump, gas cell, and datalogger). The one or more boom receivers may facilitate preventing kinking under environmental and/or operational conditions. Alternatively or additionally to one or more boom receivers, the systems may comprise one more ground receivers configured to receive one or more tubing at about ground height.

The systems described herein may comprise additional embodiments as desired. For example, the systems may comprise one or more programmable logic controllers, user interfaces any one or more of which may be operably connected to the gas detector and the one or more pumps. Such programmable logic controllers and/or user interfaces may be on, near, and/or remote from the skid.

Example System and Application

The present disclosure refers to a system and components for the direct monitoring of point-source emissions (for example methane ($CH_4$), volatile organic compounds (VOCs), hydrogen sulfide ($H_2S$), as well as other Criteria Pollutants and Greenhouse Gases (GHGs)) by Extractive Direct Interface (EDI). This system may include gas sensors operating on a variety of detection principles such as (not limited to) Non-Dispersive Infrared (NDIR) for $CO_2$, $CH_4$ and other hydrocarbon species, electrochemical gas detection ($H_2S$), and paramagnetic principles for $O_2$ analysis.

Device

The device houses a detector, which could be any low-voltage gas detector configured to read gas concentrations in parts per million (ppm) or percent by volume. The detector is capable of monitoring gases such as $CH_4$, $H_2S$, VOC, or any other hydrocarbon, greenhouse gas, or criteria pollutant, or mixture thereof. Sampling frequency is user configurable.

A sample pump which draws ambient air from the area to be monitored and into the sample chamber where the detector can measure concentration of the gas in question.

Tubing through which the sample is drawn by the sample pump from the area being monitored to the detector. Tubing can be any variety of stainless steel, braided line, Teflon, or any other plastic or metal which would not degrade in the presence of hydrocarbons or corrosive gases. Tubing can be run up to 200 feet or more from the sample pump/detector, depending on the desired flowrate of the sample pump and frictional losses inside the tubing itself.

The terminal end of the tubing in the sample area could be a plain end or any variety of connectors designed to integrate into equipment, such as a threaded connection or a quick connect.

Tubing can be placed to investigate any point source of emissions, such as a tank hatch, vent line, or exhaust stack. In the case of tank hatches, the terminal end of the line may be integrated directly into the hatch lid itself or positioned nearby.

In addition to sampling ambient/fugitive emissions, the unit could also be configured to continuously monitor combustion sources, such as a compressor engine exhaust stack, an enclosed combustor, or a dehydration unit exhaust line. The unit is capable of monitoring one or more combustion sources and/or ambient/fugitive emissions simultaneously.

In cases where combustion is being continuously monitored, further sample conditioning may be employed to remove steam from the sample stream and prevent it from condensing inside of the sample pump/test cell. This may be accomplished with, for example, a sample conditioning unit comprising, for example, a condenser tank such as a cooled condenser, which may or may not be submerged in cold water or other refrigeration mechanism to accelerate condensation. The condenser, e.g., condenser tank may be operably connected to the portable emission monitoring system in any convenient manner such as to substantially remove steam and/or other moisture or impurities prior to the emission being received at the sample port and/or detector.

Depending on the duration of the monitoring period, a single tank may be used, or tanks may be connected in series so that fluid levels within them equalize. During the monitoring period and upon completion, the operator may drain and dispose of a portion up to all of the condensed water captured by the condenser unit. Additionally, a condensing coil may be used in conjunction with a fluid trap to remove/drain liquid water from the sample stream.

The test cell may have an exhaust line to vent sample gases outside of the enclosure and prevent the accumulation of hazardous gases within the enclosure.

The unit could also be configured to operate in a fence-line monitoring application, in which ambient air would be measured for gas concentration not originating from a specific piece of equipment.

The apparatus usually comprises communications equipment, such as a cellular or satellite modem or hardwired ethernet connection (if available), which allows the user to monitor gas concentrations remotely and/or receive alarms when gas concentrations exceed a user-specified threshold.

The device can use a variety of power sources, including onboard solar/battery or AC power. In some embodiments, the device can use AC power (if available) and has the ability to generate and store power via onboard solar or wind generators, a charge controller, and batteries.

The above features would be incorporated into a single unit and packaged in a way that allows for deployment in the field. The unit may be deployed on a temporary basis or could be left on site indefinitely.

Output

The device reports gas concentrations in parts per million (ppm) or percent by volume.

Readings may be displayed on the unit itself in addition to being remotely viewable through an online portal, both in visual and tabular format.

Logs may be stored remotely or on the unit itself to be retrieved by an operator.

The system may be configured to include visible and/or audible alarms should hazardous gas concentrations on site exceed a user-configured threshold, alerting nearby personnel of the presence of such gases.

Mobility

The system may be mounted on or in a skid, cart, pallet, container, crate, or any other means by which an operator could house and transport the equipment. The above-mentioned equipment may in some embodiments be packaged as a discrete unit Detection equipment, sample pumps, power, and communications equipment are housed in weatherproof containers as necessary to prevent the substantial ingress of moisture or dust which may be encountered in some outdoor environments. Equipment may be housed in separate containers or combined into a single container depending on the user's preference.

Configurability

The detector and sample pump may be modular, allowing for several detection channels to be monitored from a single unit simultaneously. Each channel may correspond to a tubing line which is monitoring a given area or piece of equipment. The number of channels that can be monitored by a single unit is limited only by practical considerations such as power requirements and/or available space on the unit itself.

The detector, sample pump, and tubing are usually required for monitoring, but onboard solar/battery systems and communications equipment may be excluded from the skid system if both are already available on site. Additionally, data can be stored locally and manually retrieved by an operator via external hard drive.

Summary of Operation

Fugitive, combustion, and/or process-related emissions or sources are extracted from the point of release and actuation via sample port (interface) located adjacent to the hatch release fixture—tapped inside the "sensor boss" located atop the "vapor ring" of the Enviromech™ Thief Hatch Atmospheric pressure relief system; or, a small stainless steel probe consisting of ¼" stainless steel tubing may be attached to a flange bolt located on existing atmospheric pressure relief systems or process vents. Representative thief hatch systems are described in, for example, U.S. application Ser. No. 18/777,006 filed Jul. 18, 2024 and U.S. Pat. No. 12,049,355.

The sample is extracted from the point of release via tubing where it is routed outside of the hazardous zone and transported to the gas cell with the use of a sample pump. The gas cell modules, power systems, and solar array are attached to a configurable "skiff". The skid-operated skiff in some embodiments may be approximately half of the width of a standard flatbed trailer—allowing multiple units to be transported and deployed with conventional haul methods and fleet infrastructure. If monitoring combustion sources, the sample line generally passes through the condenser to remove steam/liquid water from the sample stream.

The skiff receives the sample line through a "saddle" suspended from a boom/davit affixed to the primary structure, providing strain relief. The sample line is then routed through a "sample receiver" to the inlet of each emissions module (pump, gas cell, and datalogger). These appurtenances are designed to maintain proper radii on the sample tubing to prevent kinking under environmental and operational conditions.

The gas cell located inside the emissions module may be a dual-channel system which may receive and accept a variety of emissions monitoring sensors. This allows for the measurement of critical GHGs, Criteria Pollutants, and/or gases that may present a safety risk—simultaneously. Or the system can be configured to accept single-pollutant measurement sensors which allow for full-scale analysis of emissions (i.e., 0-10,000 ppm, 10,000 ppm—Span).

The sample is analyzed for target pollutants/compounds; measurements are recorded via onboard datalogger and may be configured to report output through a Graphical User Interface (GUI) and/or through Supervisory Control and Data Acquisition (SCADA) Systems (onsite)—or through any other contemporary Enterprise Resource Planning (ERP) System. The sample is then discharged through a vent line through the pump outlet and routed to an appropriate location away from the skiff.

Figure 1B:
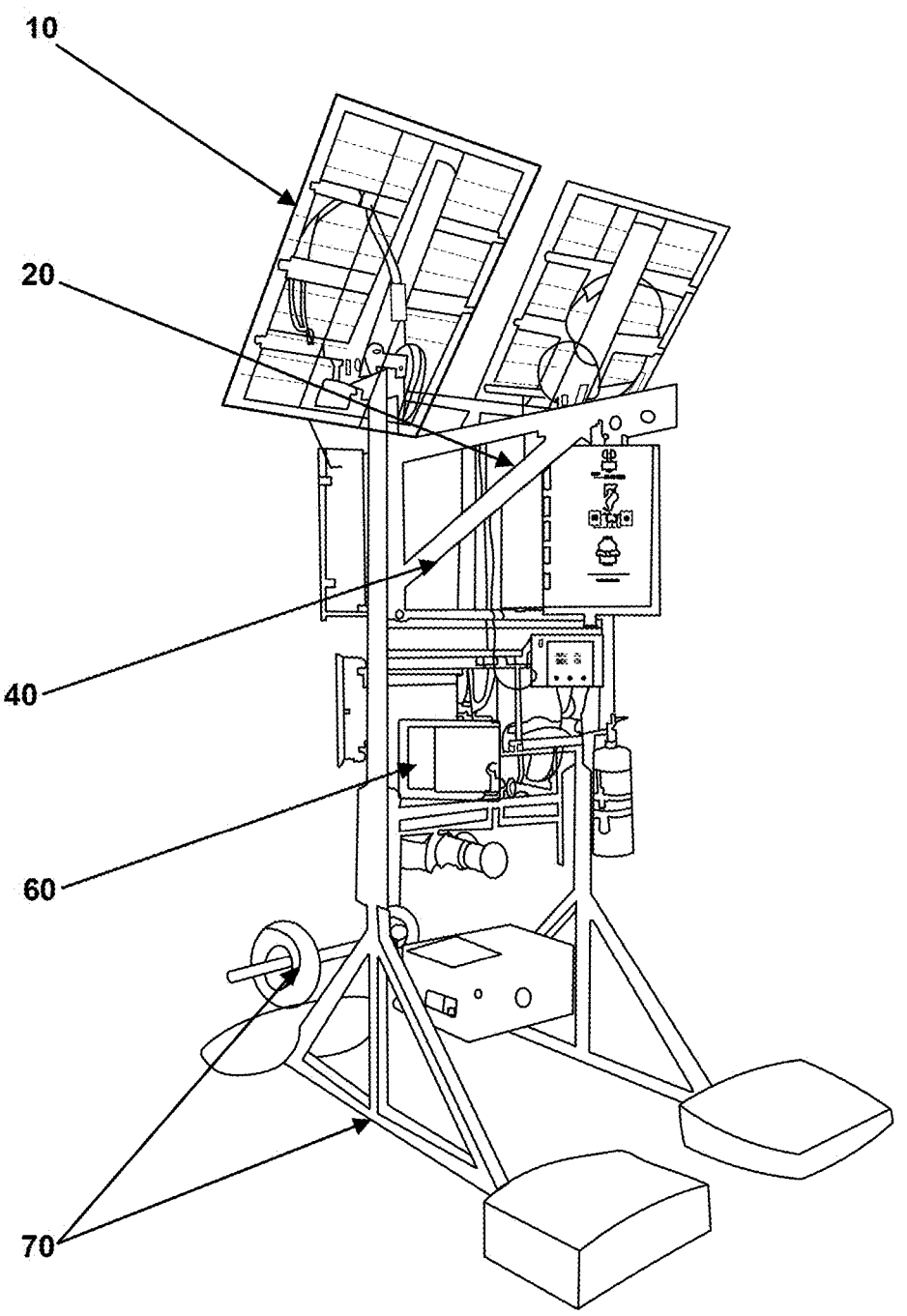
FIG. 1B shows a rear view of the representative system of FIG. 1A.

FIGS. 1A and 1B show a front view and a back view of a representative modular portable emission monitoring system. As shown in FIGS. 1A and 1B solar panels 10 are configured to provide a source of power while other sources may also be used simultaneously or alternatively. An enclosure 20 is configured to contain a battery, a modem, and/or a charge controller all of which are operably linked to the solar panels and other equipment. First and second enclosures 30 are each configured to protect one or more sample pumps and one or more detectors with one more sample ports from the weather and exterior environment. A boom receiver 40 and/or davit are configured to receive one or more tubing at an above ground height. One or more sample line inlets 50 are configured to deliver samples from a line to sample ports of the detector. If desired, AC adapter 60 may be employed. The system components may be configured to mount to a portable skid 70 having one or more wheels and/or handles.

Figure 2:
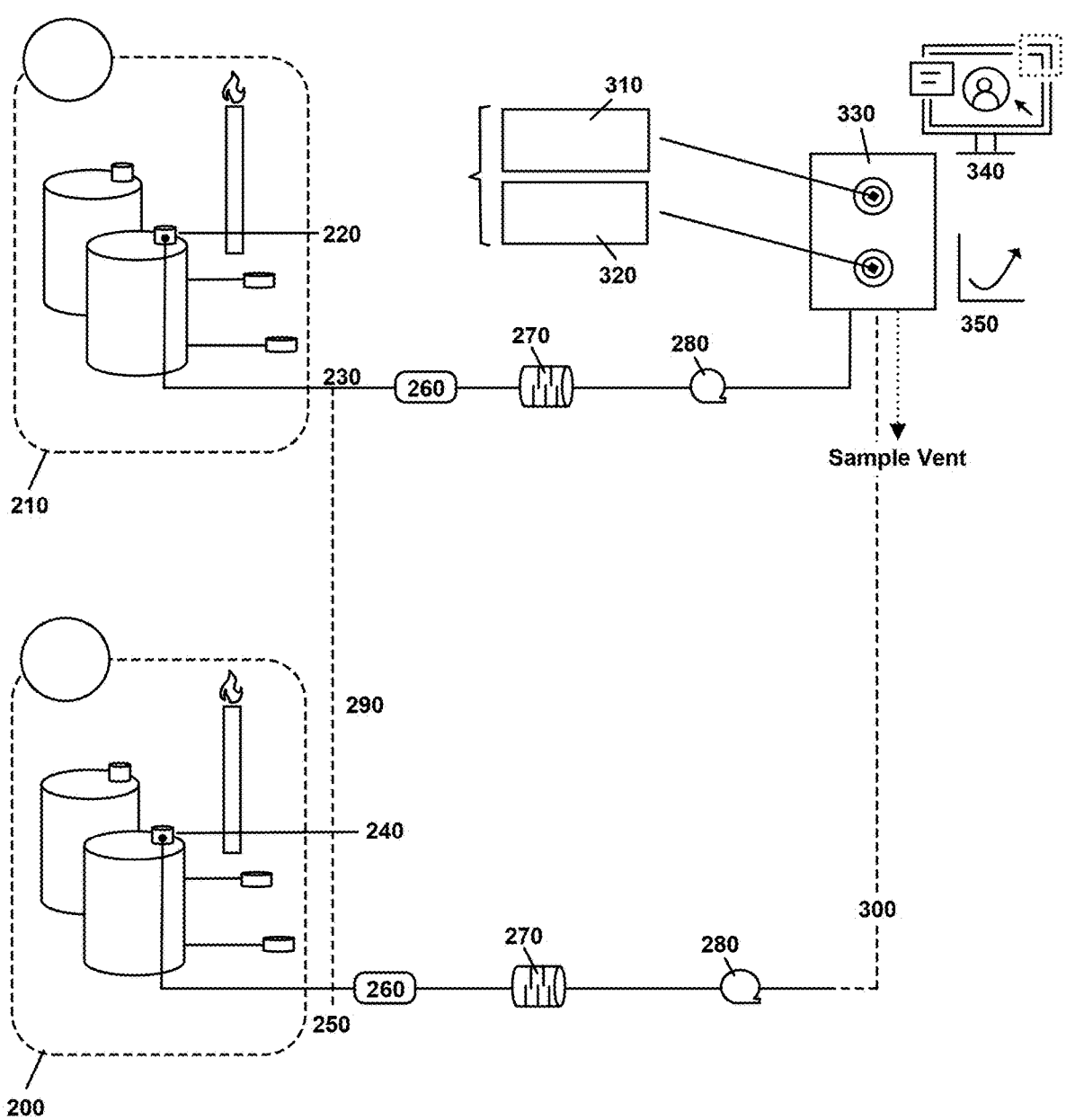
FIG. 2 shows a sample flow diagram.

FIG. 2 shows a first area 210 and a second area 200 to be monitored for one or more gas emissions. Storage tanks located in the first area 210 may be monitored for emissions at a tank outlet 220 which may be a hatch with an adapter and vapor ring. Similarly, storage tanks located in the second area 200 may be monitored for emissions at a tank outlet 240 which may be a hatch with an adapter and vapor ring.

Outlet 220 is connected to a tubing 230 that may pass a sample drawn from a sample pump 280 through a liquid knockout 260 such as a water remover device like a condenser, through an optional particulate filter 270, though the sample pump 280 and into a gas cell 330 which may have one, or two, or more sample ports. Outlet 240 may pass a sample through in a similar way through tubing 250 in a second set of a liquid knockout 260 such as a water remover device like a condenser, through an optional particulate filter 270, though the sample pump 280 and through line 300 into a gas cell 330. Alternatively, a sample taken from outlet 240 may pass through tubing 290 into the same components through which samples from outlet 220 are processed. Although not shown tubing 290 may be configured to pass through all of the same components or different components 260, 270, and 280 than samples from outlet 220.

The one, or two, or more sample ports of gas cell 330 may each be connected to a gas detector 310 and/or gas detector 320. In some embodiments the detectors 310 and 320 may be configured to detect the same gas while in other embodiments they may detect different gases. In some embodiments the detectors 310 and 320 are configured to detect different amounts of the same gas, e.g., detector 310 may detect 1-10,000 ppm of, for example, methane while detector 320 detects from 1-100% of, for example, methane.

A graphic user interface or programmable logic controller 340 may be located remotely or as shown in 350 may be local. A portable skid may encompass any or all the components shown except the areas to be monitored 210 and 200.

Figure 3:
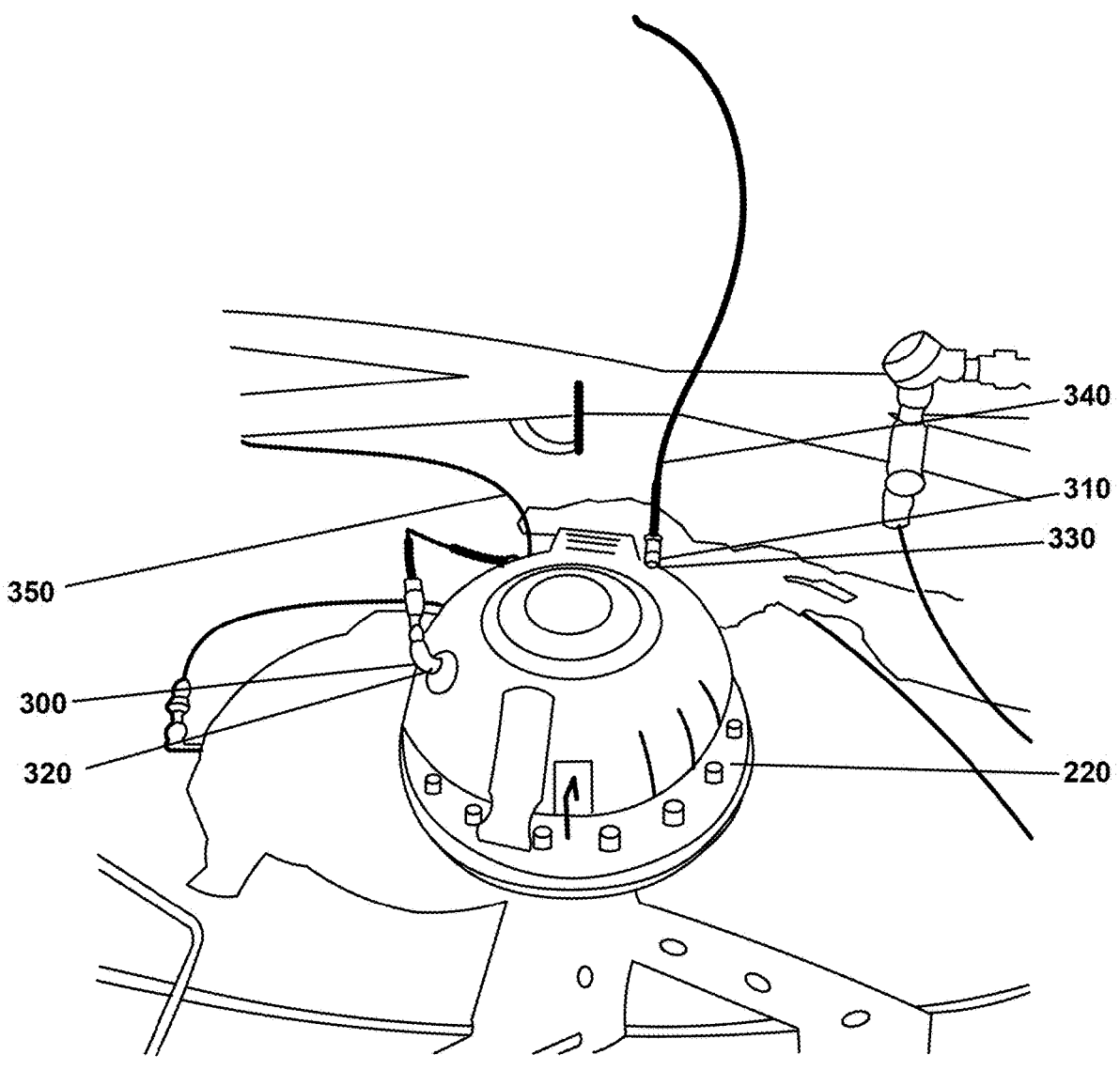
FIG. 3 shows a representative monitoring of thief hatch emissions.

FIG. 3 shows a view of an outlet 220 which is a thief hatch attached to a top of a tank. A first tubing 340 attaches to an adapter ring 310 and vapor ring 330 on the hatch. First tubing 340 may then be attached to a gas detector 310. A second tubing 350 attaches to an adapter ring 300 and vapor ring 320 on the hatch. Second tubing 350 may then be attached to a gas detector 320. Of course, second tubing 350 may be attached to an adapter ring 300 and vapor ring 320 on a second hatch on a second tank.

Specific Embodiments

Specific embodiments are described in the numbered embodiments below.

1. A portable emission monitoring system comprising:
a gas detector comprising a first and second sample port;
a first tubing that connects the first sample port to a first area to be monitored for a first gas;
a second tubing that connects the second sample port to a second area to be monitored for a second gas;
one or more pumps connected to the first tubing and the second tubing wherein the one or more pumps draw gas from the first area and the second area to the first sample port and the second sample port;
wherein the detector measures the concentration of drawn gas from the first area in the first sample port and wherein the detector measures the concentration of drawn gas from the second area in the second sample port; and
a portable skid for mounting the gas detector and the one or more pumps.

2. The portable emission monitoring system of embodiment 1 wherein the first area to be monitored comprises a first tank and the second area to be monitored comprises a second tank.

3. The portable emission monitoring system of embodiment 2 which further comprises (1) a first adapter attached to an end of the first tubing wherein the first adapter is configured to be attached to a vapor ring on a hatch of the first tank and (2) a second adapter attached to an end of the second tubing wherein the second adapter is configured to be attached to a vapor ring on a hatch of the second tank.

4. The portable emission monitoring system of embodiment 1 wherein the one or more pumps are continuous pumps to continuously draw gas from the first area and the second area.

5. The portable emission monitoring system of embodiment 1 which further comprises a programmable logic controller.

6. The portable emission monitoring system of embodiment 1 which further comprises a user interface operably connected to the gas detector and the one or more pumps.

7. The portable emission monitoring system of embodiment 6 wherein the user interface is remote from the skid.

8. The portable emission monitoring system of embodiment 1 wherein the first area to be monitored comprises a first position on a tank and the second area to be monitored comprises a second position on the tank.

9. The portable emission monitoring system of embodiment 8 wherein the first gas and the second gas each comprise the same gas and wherein the detector detects one pre-determined level of concentration of drawn gas from the first sample port and detects a second pre-determined level of drawn gas from the second sample report.

10. The portable emission monitoring system of embodiment 9 wherein the one pre-determined level of concentration is from about 0 to about 10,000 ppm and wherein the second pre-determined level of concentration is from about 10,000 ppm to about 100%.

11. The portable emission monitoring system of embodiment 1 wherein the skid comprises one or more wheels and two or more handles.

12. The portable emission monitoring system of embodiment 1 wherein the skid comprises a boom receiver to receive the first tubing, the second tubing, or both at a height above the ground.

13. The portable emission monitoring system of embodiment 1 wherein the skid comprises a ground receiver to receive the first tubing, the second tubing, or both at about ground height.

14. The portable emission monitoring system of embodiment 1 wherein the first and the second tubing comprises a thermoplastic polymer.

15. The portable emission monitoring system of embodiment 14 wherein the thermoplastic polymer comprises a polytetrafluoroethylene.

16. The portable emission monitoring system of embodiment 1 wherein the first and second tubing comprise a thermoplastic polymer enclosed by a braided stainless steel.

17. The portable emission monitoring system of embodiment 1 wherein the system is modular.

18. The portable emission monitoring system of embodiment 1 wherein the first gas and the second gas comprises methane, carbon dioxide, carbon monoxide, hydrogen sulfide, a nitrogen oxide, or any mixture thereof.

19. The portable emission monitoring system of embodiment 1 which further comprises from about two to about six additional sample ports wherein each additional sample port is connected to an added tubing that connects each additional sample port to an additional area to be monitored.

20. The portable emission monitoring system of embodiment 1 which further comprises a water remover device to remove water prior to the first sample port, the second sample port, or both.

21. The portable emission monitoring system of embodiment 1 wherein the system further comprises a sample conditioning unit.

22. The portable emission monitoring system of embodiment 21 wherein the sample conditioning unit comprises a condenser operably connected to the system and configured to condense and substantially remove steam prior to the first sample port, the second sample port, or both.

23. The portable emission monitoring system of embodiment 22 wherein the condenser is a cooled condenser.

24. The portable emission monitoring system of embodiment 1 wherein the first area to be monitored, the second area to be monitored, or both comprises a combustion source.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A portable emission monitoring system comprising:
a first and second sample port of one or more gas detectors;
a first tubing that connects the first sample port to a first tank to be monitored for a first gas;
a second tubing that connects the second sample port to a second tank to be monitored for a second gas;
one or more pumps connected to the first tubing and the second tubing wherein the one or more pumps draw gas from the first tank and the second tank to the first sample port and the second sample port respectively;
wherein the one or more gas detectors measures the concentration of drawn gas from the first tank in the first sample port and wherein the one or more gas detectors measures the concentration of drawn gas from the second tank in the second sample port;
a portable skid for mounting the one or more gas detectors and the one or more pumps; and (1) a first adapter attached to an end of the first tubing wherein the first adapter is configured to be attached to a vapor ring on a hatch of the first tank and (2) a second adapter attached to an end of the second tubing wherein the second adapter is configured to be attached to a vapor ring on a hatch of the second tank; wherein the portable emission monitoring system monitors emissions from the first and the second tank.

2. The portable emission monitoring system of claim 1 which further comprises the first tank and the second tank.

3. The portable emission monitoring system of claim 1 wherein the one or more pumps are continuous pumps to continuously draw gas from the first tank and the second tank.

4. The portable emission monitoring system of claim 1 which further comprises a programmable logic controller.

5. The portable emission monitoring system of claim 1 which further comprises a user interface operably connected to the one or more gas detectors and the one or more pumps.

6. The portable emission monitoring system of claim 5 wherein the user interface is remote from the skid.

7. The portable emission monitoring system of claim 1 wherein the first gas and the second gas each comprise the same gas and wherein the one or more gas detectors detects one pre-determined level of concentration of drawn gas from the first sample port and detects a second pre-determined level of drawn gas from the second sample port.

8. The portable emission monitoring system of claim 7 wherein the one pre-determined level of concentration is from about 0 to about 10,000 ppm and wherein the second pre-determined level of concentration is from about 10,000 ppm to about 100%.

9. The portable emission monitoring system of claim 1 wherein the skid comprises one or more wheels and two or more handles.

10. The portable emission monitoring system of claim 1 wherein the skid comprises a boom receiver to receive the first tubing, the second tubing, or both at a height above the ground.

11. The portable emission monitoring system of claim 1 wherein the skid comprises a ground receiver to receive the first tubing, the second tubing, or both at about ground height.

12. The portable emission monitoring system of claim 1 wherein the first and the second tubing comprises a thermoplastic polymer.

13. The portable emission monitoring system of claim 12 wherein the thermoplastic polymer comprises a polytetrafluoroethylene.

14. The portable emission monitoring system of claim 1 wherein the first and second tubing comprise a thermoplastic polymer enclosed by a braided stainless steel.

15. The portable emission monitoring system of claim 1 wherein the system is modular.

16. The portable emission monitoring system of claim 1 wherein the first gas and the second gas comprises methane, carbon dioxide, carbon monoxide, hydrogen sulfide, a nitrogen oxide, a volatile organic compound, or any mixture thereof.

17. The portable emission monitoring system of claim 1 which further comprises from about two to about six additional sample ports wherein each additional sample port is connected to an added tubing that connects each additional sample port to an additional tank to be monitored.

18. The portable emission monitoring system of claim 1 which further comprises a water remover device to remove water prior to the first sample port, the second sample port, or both.

19. The portable emission monitoring system of claim 1 wherein the system further comprises a sample conditioning unit.

20. The portable emission monitoring system of claim 19 wherein the sample conditioning unit comprises a condenser operably connected to the system and configured to condense and substantially remove steam prior to the first sample port, the second sample port, or both.

21. The portable emission monitoring system of claim 20 wherein the condenser is a cooled condenser.

22. The portable emission monitoring system of claim 1 wherein the first tank to be monitored, the second tank to be monitored, or both comprises a combustion source.

23. The portable emission monitoring system of claim 1 wherein the one or more gas detectors comprises one gas detector and the first and the second sample port are on the one gas detector.

24. The portable emission monitoring system of claim 1 wherein the one or more gas detectors comprises two gas detectors and the first and the second sample port are each on a different gas detector.

* * * * *